United States Patent [19]

Sielfeld

[11] Patent Number: 4,540,759
[45] Date of Patent: Sep. 10, 1985

[54] POLYMERIZATION OF VINYL CHLORIDE IN THE PRESENCE OF A CATALYST SOLUBILIZED PRIOR TO EXPOSURE TO MONOMER

[75] Inventor: Gilbert Sielfeld, Marl, Fed. Rep. of Germany

[73] Assignee: Chemische Werke Huels AG, Marl, Fed. Rep. of Germany

[21] Appl. No.: 409,796

[22] Filed: Aug. 20, 1982

[30] Foreign Application Priority Data

Aug. 20, 1981 [DE] Fed. Rep. of Germany ....... 3132888

[51] Int. Cl.$^3$ ................................................ C08F 2/20
[52] U.S. Cl. ..................................... 526/200; 526/201
[58] Field of Search ................................. 526/200, 201

[56] References Cited

U.S. PATENT DOCUMENTS

| | | | |
|---|---|---|---|
| 3,358,054 | 12/1967 | Dietrich et al. ....................... | 525/31 |
| 3,853,970 | 12/1974 | Dietrich ............................... | 264/331 |
| 4,011,388 | 3/1977 | Murphy ............................... | 526/201 |

FOREIGN PATENT DOCUMENTS

| | | | |
|---|---|---|---|
| 152346 | 11/1981 | Fed. Rep. of Germany ...... | 526/201 |
| 41010 | 12/1971 | Japan ................................... | 526/201 |
| 1224693 | 3/1971 | United Kingdom ................ | 526/201 |

*Primary Examiner*—Christopher A. Henderson
*Attorney, Agent, or Firm*—Millen & White

[57] ABSTRACT

A process for producing vinyl chloride polymers and copolymers by suspension polymerization is carried out in the presence of small amounts of ethylene/vinyl acetate copolymers with a vinyl acetate content of 38% by weight to 55% by weight and with a viscosity number of 95–210 ml/g, the catalyst being added to the polymerization charge in dissolved form. The resultant polymers are suitable for lowering the viscosity of polyvinyl chloride plastisols.

15 Claims, No Drawings

POLYMERIZATION OF VINYL CHLORIDE IN THE PRESENCE OF A CATALYST SOLUBILIZED PRIOR TO EXPOSURE TO MONOMER

BACKGROUND OF THE INVENTION

The present invention concerns the production of a fine-grained vinyl chloride suspension polymer and its use as a viscosity-lowering medium in polyvinyl chloride plastisol processing.

Herein, polyvinyl chloride plastisols or polyvinyl chloride pastes are understood to mean, in general, dispersions of fine polyvinyl chloride powders in plasticizers. Suitable paste-forming types of polyvinyl chloride include emulsion polymers and, in particular, also microsuspension polymers.

These polyvinyl chloride products are obtained after polymerization in latex form. They are processed generally by spray-drying into agglomerated secondary particles (plastisol grades). During plastisol processing, these agglomerates disintegrate predominantly into primary particles. The degree of such disintegration and the particle size distribution of the primary particles determine the flow properties of the paste.

Polyvinyl chloride pastes are utilized primarily as spread-coating pastes, dip-coating pastes, casting pastes, and molding pastes for a great variety of finished articles.

In general, pastes of low viscosities are desirable for the manufacture of finished articles low in plasticizer. It is known for this purpose to lower the paste viscosity by the addition of fine-grained suspension polyvinyl chloride products (so-called extender polyvinyl chloride). These are not paste-forming and are dissolved only at the gelling temperature.

According to German Pat. No. 1,645,668, it is possible to produce such suspension polymers for lowering the viscosity of dispersions of paste-forming polyvinyl chloride and plasticizers using methylhydroxypropylcelluloses having a viscosity of 50–500 m Pa s at 20° C. in a 2% by weight solution, as the only suspension stabilizer, and using monomer-soluble catalysts.

However, as can be seen from Comparative Examples A and B herein, polymers produced in this way have a considerable proportion of coarse particles having a particle size > 100 μm. This leads to an undesirable sedimentation of the coarse proportion and therefore causes difficulties during processing. Furthermore, the coarse proportion results in an undesirably rough surface, especially when applying very thin coatings. Also, the lowering in viscosity of the pastes by the addition of suspension polymers produced in this way fails to satisfy presently prevailing practical requirements.

As can be seen from Comparative Test C herein, very finely divided polyvinyl chloride polymers can be prepared by suspension polymerization in the presence of a suspension stabilizer and a tenside or emulsifier.

Because of its fineness and its minimum proportion of coarse particles > 100 μm in size, a so-prepared polymer is suitable for thin coatings and does not tend toward sedimentation. However, due to its very high granular porosity, resulting from the addition of emulsifiers or tensides, the thus-manufactured product results in an inadequate lowering of paste viscosity.

SUMMARY OF THE INVENTION

Accordingly, it is an object of this invention to overcome, or greatly ameliorate these disadvantages by providing an improved pocess for the production of vinyl chloride polymers and copolymers and the polymers thus produced, e.g., as extender PVC.

Upon further study of the specification and appended claims, further objects and advantages of this invention will become apparent to those skilled in the art.

These objects have been achieved by providing a process for the production of vinyl chloride polymers or copolymers by suspension polymerization in the presence of monomer-soluble catalysts and one or more suspension stabilizers and optionally pH buffer systems, comprising carrying out the polymerization in the presence of 0.4–8.0% by weight, based on the amount of monomer, of ethylene/vinyl acetate copolymer with a vinyl acetate content of 38% by weight to 55% by weight, and with a viscosity number of 95–210 ml/g, measured in toluene in a concentration of 0.005 g/cm$^3$ at 25° C.; with the proviso that the catalyst is added to the polymerization charge in dissolved form or is dissolved in the polymerization reactor before addition of the total monomer charge.

DETAILED DISCUSSION

According to this invention, the generally solid catalysts, which are generally shelf-stable at room temperature, are to be dissolved in an inert solvent or solvent mixture. Usually, the amount of solvent is 0.05–5% by weight, preferably 0.3–3% by weight, based on the weight of monomer or monomer mixture. The catalysts thus can be introduced in dissolved form into the polymerization reactor, suitably prior to adding the monomers or monomer mixture. Optionally, the dissolution step can also take place in the reactor proper before the monomers are added.

Suitable for catalyst dissolution are all customary solvents capable of dissolving the catalysts employed. In particular, suitable for use are inert, aliphatic hydrocarbons, such as n-hexane, cyclohexane, high-test gasoline, aromatic hydrocarbons, such as toluene, xylene, or customary primary or secondary plasticizers for vinyl chloride polymers, such as $C_2$–$C_{14}$-alkyl esters of dicarboxylic acid. Examples of especially preferred plasticizers are diethyl-hexyl phthalate, dibutyl phthalate, di-2-n-heptyl phthalate, and diisodecyl phthalate. These are employed in amounts of 0.05 to 5% by weight, preferably 0.5–3% by weight, based on the weight of monomer or monomer mixture.

If products having a modified molecular weight are desired for reasons of a particular end use, suitable solvents for the catalysts are the usual molecular weight regulators, such as, for example, chlorinated or brominated hydrocarbons and/or chain-branching media such as, for example, phthalic acid diallyl ester or maleic acid diallyl ester.

From a theoretical viewpoint, it is also possible to use as the solvent for the conventional catalysts used in vinyl chloride polymerization, the vinyl chloride monomer itself or its comonomers, such as, for example, vinyl acetate in a higher amount as discribed above for the other solvents, e.g. 50% of the total amount of the monomer. However, for production safety reasons, this possibility is not generally utilized.

Suitable catalysts include those usually employed in vinyl chloride polymerization, such as diacyl peroxides, peroxydicarbonates, alkyl peresters, or azo compounds. For reasons of production safety, however, initiators which are solid at room temperature and are shelf-stable are especially well suited. Examples of suitable shelf-stable initiators include lauroyl peroxide, bis(4-tert-butylcyclohexyl)peroxydicarbonate, dimyristylperoxydicarbonate, dicetylperoxydicarbonate, bis(2-methylbenzoyl)peroxide, etc. Catalysts are usually used in amounts of 0,01–0,5 wt. % based on the weight of monomers.

Suitable as the ethylene/vinyl acetate copolymers to be used according to the invention are those consisting of 38–55% by weight, preferably 42–48% by weight, of vinyl acetate, the remainder being ethylene, and having a viscosity number of 95–210 ml/g, preferably 110–160 ml/g, measured in toluene in a concentration of 0.005 g/cm$^3$ at 25° C. These are generally added in amounts of 0.4–8% by weight, preferably 0.6–3% by weight, based on the weight of the monomer or monomer mixture. They can be introduced into the polymerization reactor in the solid phase or dissolved form, optionally, together with the catalysts. Suitable solvents for these copolymers include the mentioned solvents typical for vinyl chloride catalysts, e.g. aromatic, aliphatic hydrocarbons or customary polyvinyl chloride plasticizers, such as esters of polycarboxylic acids. The dissolving step can take place before or after addition of the monomer or monomer mixture. The ethylene-vinyl acetate copolymers are commercially available under the trade name "LEVAPREN". They can be fully conventionally produced by radical polymerization in solution at a pressure of 100–400 bar and a temperature of 30°–250° C., for example as described in German Pat. No. 1,126,613, whose disclosure is incorporated by reference herein.

Suitable suspension stabilizers include all compounds usually employed in suspension polymerization, such as polyvinyl acetate, partially hydrolyzed polyvinyl acetates and cellulose ethers, etc. Such media are described in the monograph by Kainer, "Polyvinylchlorid und Vinylchlorid-Mischpolymerisate" [Polyvinyl Chloride and Vinyl Chloride Copolymers], Springer Publishers (1965), pages 16 et seq, whose disclosure is incorporated by reference herein.

Preferred suspension stabilizers or protective colloids are the commercially available methylcelluloses with methoxy substitution degrees of 22–34% and viscosities of 10–5,000 m Pa s, preferably 10–100 m Pa s, measured in a 2% by weight aqueous solution (according to Brookfield at 20° C. and at 20 rpm), and/or methylhydroxypropylcelluloses having methoxy substitution degrees of 20–32% and hydroxy-propoxy substitution degrees of 2–9%, and viscosities of 25–5,000, preferably 40–120 m Pa s, measured in a 2% aqueous solution (Ubbelohde capillary viscometer) at 20° C.

All of these are ordinarily employed in amounts of 0.05–1.5% by weight, preferably 0.1–1.0% by weight, based on the amount of monomer.

As other optional polymerization aids, it is possible to employ, if desired, conventional effective amounts of pH buffering systems, such as ammonium salts, ammonia, or alkali carbonates, chain modifiers, e.g. aliphatic aldehydes, trichloroethylene, auxiliary agents to fight wall deposits, antioxidants, etc., all in conventional amounts, e.g., generally 0.005–2.0 wt. % based on the amount of monomers.

The polymerization can be conducted at the customary temperatures of 30° to 80° C., preferably 45°–75° C., and under the corresponding pressures.

The use of up to 30% by weight of monomers polymerizable with vinyl chloride is possible for the preparation of copolymers. Examples of suitable comonomers are well-known and include vinyl esters, such as vinyl acetate, vinylidene halogenides, such as vinylidene chloride, acrylic acid and methacrylic acid alkyl esters of 1–18 carbon atoms in the alkyl group, such as the methyl, n-butyl, and lauryl esters, esters of maleic acid, such as diethyl, dipropyl maleate, monoolefins, such as ethylene or propylene, etc.

The suspension polymers of this invention can be processed according to the usual, well-known methods. The customarily degasified, aqueous polyvinyl chloride suspension can first be dewatered in a centrifuge, the product optionally washed with pure water, and subsequently fed to a flash dryer. Optionally, a further drying step can be carried out in a drum dryer.

The polymers prepared according to this invention can be used according to this invention as viscosity-lowering agents in admixture with 95–45% by weight, preferably 90–50% by weight, of paste-forming polyvinyl chloride, such as emulsion or microsuspension polyvinyl chloride. As is known, emulsion or microsuspension polymers are used as polyvinyl chloride grades which form a paste with plasticizers and other additives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth uncorrected in degrees Celsius; unless otherwise indicated, all parts and percentages are by weight.

EXAMPLE 1

A 40-liter polymerization autoclave of stainless steel, equipped with an impeller agitator and Pfaudler baffle, was charged with the following components: 17,000 parts of water; 10 parts of sodium carbonate; 60 parts of a methylhydroxypropylcellulose dissolved in 1,500 parts of water and having a methoxy content of 22.1% by weight, a hydroxypropoxy content of 8.1% by weight, and a viscosity of 100 m Pa S (measured in an Ubbelohde capillary viscometer in a 2% aqueous solution at 20° C.); 3.4 parts of dicetylperoxydicarbonate; 6 parts of dilauroyl peroxide dissolved in 310 parts of cyclo hexane; and 100 parts of an ethylene/vinyl acetate copolymer with a vinyl acetate content of 45% by weight and a viscosity number of 138 ml/g, measured in toluene in a concentration of 0.005 g/cm$^3$ at 25° C. The reactor was sealed, purged with nitrogen, evacuated, and then charged with 11,200 parts of vinyl chloride. To dissolve the ethylene/vinyl acetate copolymer, the mixture was agitated at room temperature for three hours. Thereafter, the polymerization was conducted at a temperature of 60° C. and up to a pressure of 5 bar. The product, after degasification, was separated from the largest portion of the suspension water, rinsed with water, and dried at 50° C. in a fluidized bed dryer. As can be seen from Table 1, a very fine product results, effecting a marked reduction of past viscosity when blended with paste-forming PVC.

EXAMPLE 2

The procedure of Example 1 was repeated, but the ethylene/vinyl acetate copolymer was dissolved together with the peroxides in 460 parts of cyclohexane. As can be derived from Table 1, the thus-prepared product has a very fine grain and shows a pronounced viscosity-lowering characteristic when blended with paste-forming PVC.

this product shows a lack of viscosity-lowering properties when mixed with paste-forming grade of PVC.

COMPARATIVE EXAMPLE D

The process of Comparative Example C was re-

TABLE 1

| | Particle Size Distribution in % by Weight Retained on Sieve, in Mesh | | | | Bulk Density[1] [g/l] | Plasticizer Absorption[2] g DOP / 100 g PVC | Paste Viscosity[3] in d Pa s at Shear Rate | | | | Tear[4] Strength [N/mm$^2$] | Elongation at Rupture[4] [%] |
|---|---|---|---|---|---|---|---|---|---|---|---|---|
| | 40 μm | 63 μm | 100 μm | 160 μm | | | 0.3s$^{-1}$ | 1s$^{-1}$ | 10s$^{-1}$ | 100s$^{1}$ | | |
| Example 1 | 56 | 1.3 | — | — | 704 | 5.0 | 120 | 88 | 88 | 98 | 12.5 | 117 |
| Example 2 | 63 | 0.1 | — | — | 710 | 5.7 | 85 | 83 | 92 | 106 | 14.6 | 159 |
| Comp. Ex. A | 84 | 58 | 5.1 | 0.2 | 574 | 13.8 | 208 | 208 | 223 | — | 11.9 | 112 |
| Comp. Ex. B | 81 | 33 | 9.2 | 0.2 | 640 | 10.3 | 138 | 131 | 146 | 147 | 11.8 | 120 |
| Comp. Ex. C | 63 | 2.6 | 0.2 | — | 523 | 14.0 | 687 | 637 | 569 | 494 | 16.7 | 156 |
| Comp. Ex. D | 75 | 32.0 | 1.0 | 0.1 | 558 | 12.2 | 345 | 340 | 303 | 242 | 11.0 | 100 |
| Example 3 | 74 | 2.9 | 0.03 | — | 687 | 6.5 | 78 | 72 | 82 | 97 | 13.4 | 115 |
| Example 4 | 68 | 2.3 | 0.02 | — | 698 | 6.6 | 95 | 100 | 115 | 129 | 12.6 | 114 |
| Comp. Ex. E | 79 | 56 | 31.4 | 10.0 | 601 | 13.1 | 162 | 152 | 161 | 167 | 11.6 | 120 |
| Example 5 | 76 | 2.8 | 0.02 | — | 663 | 6.6 | 120 | 105 | 110 | 120 | 12.1 | 127.7 |
| Example 6 | 54 | 0.9 | — | — | 721 | 5.4 | 79 | 76 | 89 | 103 | 15.4 | 168 |

(1) According to DIN 53 468

(2) According to DIN 53 417/1 (centrifuging method)

(3) Paste Formulation:
50 parts by weight of microsuspension polyvinyl chloride
50 parts by weight of polyvinyl chloride produced according to this invention
38 parts by weight of di-2-ethylhexylphthalate
2 parts by weight of Ba/Cd/Zn stabilizer
Paste Viscosity was measured in a "Rheomat" (Contraves) after a storage period of 24 hours.

(3) Gelling Capacity of paste (after breathing) was measured on 1 mm press-molded plates (gelling time being 1 minute at 170° C.) according to DIN 53 455 (tensile stength test). The tear strength values and the elongation at rupture values are averages from 7 measured values.

COMPARATIVE EXAMPLE A (According to German Pat. No. 1,645,668)

The procedure of Example 1 was repeated, but the polymerization was conducted in the absence of cyclohexane and ethylene/vinyl acetate copolymer. As can be seen from Table 1, a product is obtained having an undesirable, high proportion of coarse particles larger than 100 μm. Moreover, the thus-produced product effects insufficient lowering of paste viscosity in a blend with paste-forming PVC.

COMPARATIVE EXAMPLE B (According to German Pat. No. 1,645,668)

The procedure of Comparative Example A was followed, but 30 parts of methylhydroxypropylcellulose was utilized. As can be seen from Table 1, again, a product is obtained having too high a proportion of particles larger than 100 μm.

COMPARATIVE EXAMPLE C

The procedure of Comparative Example B was repeated, but using 4 parts of methylhydroxypropylcellulose and additionally 2.5 parts of sodium lauryl sulfate. As can be seen from Table 1, a fine product is obtained due to the presence of the tenside, but because of an increased grain porosity (plasticizer absorption), peated, but using 1.5 parts of sodium lauryl sulfate. As can be seen from Table 1, a product again results having a deficient viscosity-lowering characteristic.

EXAMPLE 3

The procedure of Example 1 was repeated, but the initiators and the ethylene/vinyl acetate copolymer were dissolved in 7,200 parts of vinyl chloride and introduced into the reactor filled with water, sodium carbonate, and suspension stabilizer. Thereafter, the remaining 4,000 parts of vinyl chloride was added. As can be seen from Table 1, a very fine product results having a pronounced viscosity-lowering property when blended with paste-forming PVC.

EXAMPLE 4

The procedure of Example 1 was followed, but using, instead of methylhydroxypropylcellulose, 60 parts of a methylcellulose having a viscosity of 60 m Pa s, measured according to Brookfield (2% by weight aqueous solution at 20° C. and 20 rpm) and a methoxy substitution degree of 28%. As can be derived from Table 1, the thus prepared product has a very fine grain and a pronounced viscosity-lowering characteristic in a blend with paste-forming PVC.

COMPARATIVE EXAMPLE E

The process was carried out as described in Comparative Example A, but employing, instead of methylhydroxypropylcellulose, 60 parts of a methylcellulose having a viscosity of 60 m Pa s, measured according to Brookfield (2% by weight aqueous solution at 20° C. and 20 rpm) and a methoxy substitution degree of 28%. As can be derived from Table 1, the thus-produced material has a very high proportion of particles larger than 100 μm and a deficient viscosity-lowering effect in a blend with paste-forming PVC.

EXAMPLE 5

The process was conducted as disclosed in Example 2, but using, in place of methylhydroxypropylcellulose, equal parts of the methylcellulose utilized in Example 4. The initiators were dissolved, together with the ethylene/vinyl acetate copolymer, in 310 parts of cyclohexane. As can be derived from Table 1, the thus-prepared product has a very fine grain and shows pronounced viscosity-lowering effect in a blend with paste-forming PVC.

EXAMPLE 6

The procedure of Example 1 was repeated, but using, instead of 310 parts of cyclohexane, 200 parts of di-2-ethylhexyl phthalate. As can be seen from Table 1, the thus-prepared product has a very fine grain and a pronounced viscosity-lowering property in a blend with paste-forming PVC.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing a vinyl chloride polymer or copolymer by suspension polymerization in the presence of a monomer-soluble catalyst and a suspension stabilizer, comprising carrying out the polymerization at a temperature of 45°–75° C. in the presence of 0.4–8.0% by weight of an ethylene/vinyl acetate copolymer having a vinyl acetate content of 38% to 55% by weight, and a viscosity number of 95–210 ml/g, measured in toluene in a concentration of 0.005 g/cm$^3$ at 25° C.; the improvement wherein the catalyst is dissolved in a reaction compatible solvent when added to the polymerization charge and wherein the suspension stabilizer comprises 0.05–1.5% by weight, based on the amount of monomer or monomer mixture, of a methylcellulose having a methoxy substitution degree of 22–34% and a viscosity of 10–5,000 m Pa s, measured in a 2% by weight aqueous solution and measured according to the Brookfield method at 20° C. and 20 rpm, or a methylhydroxypropylcellulose with a methoxy substitution degree of 20–32% and a hydroxy-propoxy substitution degree of 2–9% and a viscosity of 25–5,000 m Pa s, measured in a 2% by weight aqueous solution using a Ubbelohde capillary viscometer at 20° C.

2. A process of claim 1 conducted in the presence of a pH buffer system.

3. A process of claim 1 wherein the ethylene/vinyl acetate copolymer has a vinyl acetate content of 42–48% by weight.

4. A process of claim 1 or 3 wherein the ethylene/vinyl acetate copolymer has a viscosity number of 110 ml/g to 160 ml/g, measured in toluene in a concentration of 0.005 g/cm$^3$ at 25° C.

5. In a process for producing a vinyl chloride polymer or copolymer by suspension polymerization in the presence of a monomer-soluble catalyst and a suspension stabilizer, comprising carrying out the polymerization at a temperature of 45°–75° C. in the presence of 0.4–8.0% by weight of an ethylene/vinyl acetate copolymer having a vinyl acetate content of 38% to 55% by weight, and a viscosity number of 95–210 ml/g, measured in toluene in a concentration of 0.005 g/cm$^3$ at 25° C.; the improvement wherein the catalyst is dissolved in the polymerization reactor charge before addition thereto of the monomer charge.

6. A process of claim 5 conducted in the presence of a pH buffer system.

7. A process of claim 5 wherein the ethylene/vinyl acetate copolymer has a vinyl acetate content of 42–48% by weight.

8. A process of claim 5 wherein the ethylene/vinyl acetate copolymer has a viscosity number of 110 ml/g to 160 ml/g, measured in toluene in a concentration of 0.005 g/cm$^3$ at 25° C.

9. A process of claim 8 wherein the amount of cellulose derivative is 0.1–1.0% by weight, the viscosity of the methylcellulose is 10–100 m Pa s and the viscosity of the methylhydroxypropylcellulose derivative is 40–120 m Pa s.

10. A process of claim 5 wherein the polymerization is conducted in the presence of 0.6–3% by weight of ethylene/vinyl acetate copolymer, based on the weight of monomer or monomer mixture.

11. A process of claim 5 wherein the suspension stabilizer comprises 0.05–1.5% by weight, based on the amount of monomer or monomer mixture, of a methylcellulose having a methoxy substitution degree of 22–34% and a viscosity of 10–5,000 m Pa s, measured in a 2% by weight aqueous solution and measured according to the Brookfield method at 20° C. and 20 rpm, or a methylhydroxypropylcellulose with a methoxy substitution degree of 20–32% and a hydroxy-propoxy substitution degree of 2–9% and a viscosity of 25–5,000 m Pa s, measured in a 2% by weight aqueous solution using a Ubbelohde capillary viscometer at 20° C.

12. A process of claim 11 wherein the amount of cellulose derivative is 0.1–1.0% by weight, the viscosity of the methylcellulose is 10–100 m Pa s and the viscosity of the methylhydroxypropylcellulose derivative is 40–120 m Pa s.

13. A process of claim 1 wherein the catalyst is dissolved in 0.05 to 5% by wt. based on the amount of monomer, of a solvent prior to being added to the reactor and then is added to the reactor prior to addition of monomers thereto.

14. A process of claim 1 wherein the polymerization is conducted in the presence of 0.6–3% by weight of ethylene/vinyl acetate copolymer, based on the weight of monomer or monomer mixture.

15. A process of claim 1 wherein the solvent is inert.

* * * * *